US006923506B2

(12) United States Patent
Tanabe et al.

(10) Patent No.: US 6,923,506 B2
(45) Date of Patent: Aug. 2, 2005

(54) INTERLOCK SYSTEM FOR SEAT BELT RETRACTOR

(75) Inventors: Masahiro Tanabe, San Antonio, TX (US); Luis Cendejas, San Antonio, TX (US)

(73) Assignee: Takata Seat Belts, Inc., Auburn Hills, MI (US)

( * ) Notice: Subject to any disclaimer, the term of this patent is extended or adjusted under 35 U.S.C. 154(b) by 102 days.

(21) Appl. No.: 10/298,146

(22) Filed: Nov. 15, 2002

(65) Prior Publication Data

US 2004/0095011 A1 May 20, 2004

(Under 37 CFR 1.47)

(51) Int. Cl.[7] .......................... B60R 22/36; B60R 22/12; B60R 21/00; A62B 35/00
(52) U.S. Cl. ....................... 297/476; 297/478; 297/480; 297/378.11; 297/378.12
(58) Field of Search ................................ 297/476, 478, 297/479, 480, 378.11, 378.12

(56) References Cited

U.S. PATENT DOCUMENTS

| | | | | |
|---|---|---|---|---|
| 3,343,765 A | * | 9/1967 | Baker ...................... | 297/478 X |
| 3,857,528 A | * | 12/1974 | Fiala ....................... | 297/476 X |
| 3,918,658 A | * | 11/1975 | Beller ..................... | 297/478 X |
| 4,063,695 A | * | 12/1977 | Oshikawa ............... | 297/478 X |
| 4,084,840 A | * | 4/1978 | Buff et al. ................ | 297/478 |
| 4,135,683 A | * | 1/1979 | Stephenson et al. ..... | 297/478 X |
| 4,164,337 A | * | 8/1979 | Blom ...................... | 297/478 X |
| 4,312,521 A | * | 1/1982 | Thomas et al. ......... | 297/478 X |
| 4,323,204 A | * | 4/1982 | Takada ...................... | 297/479 |
| 4,343,444 A | * | 8/1982 | Francis ................... | 297/478 X |
| 4,373,748 A | * | 2/1983 | Reid et al. .............. | 297/478 X |
| 4,394,993 A | * | 7/1983 | Stamboulian et al. ... | 297/478 X |
| 5,071,194 A | * | 12/1991 | Fohl ........................ | 297/478 |
| 5,484,190 A | * | 1/1996 | Corrion et al. ............. | 297/476 |
| 5,495,994 A | * | 3/1996 | Rumpf et al. ............ | 297/478 X |
| 5,765,774 A | * | 6/1998 | Maekawa et al. ........ | 297/478 X |
| 5,791,582 A | * | 8/1998 | Ernst ....................... | 297/478 X |
| 5,823,570 A | * | 10/1998 | Lane et al. .............. | 297/476 X |
| 5,839,790 A | * | 11/1998 | Doty .......................... | 297/478 |
| 5,882,084 A | * | 3/1999 | Verellen et al. ............. | 297/478 |
| 5,950,952 A | * | 9/1999 | Koketsu .................. | 297/478 X |
| 6,045,194 A | | 4/2000 | Kielwein et al. ............ | 297/476 |
| 6,068,341 A | * | 5/2000 | Rink ....................... | 297/478 X |
| 6,123,393 A | * | 9/2000 | Weller ........................ | 297/478 |
| 6,155,513 A | * | 12/2000 | Smithson ................ | 297/478 X |
| 6,164,581 A | * | 12/2000 | Freeman et al. ......... | 297/478 X |
| 6,244,663 B1 | | 6/2001 | Doty .......................... | 297/478 |
| 6,254,191 B1 | * | 7/2001 | Yamamoto et al. ......... | 297/478 |
| 6,283,553 B1 | * | 9/2001 | Anderson et al. ........... | 297/478 |
| 6,299,093 B1 | * | 10/2001 | Harte et al. ............. | 297/478 X |
| 6,302,489 B1 | | 10/2001 | Coppo ........................ | 297/478 |
| 6,340,209 B1 | * | 1/2002 | Yamamoto et al. ......... | 297/478 |
| 6,371,563 B1 | * | 4/2002 | Washizuka .................. | 297/476 |
| 6,412,875 B1 | * | 7/2002 | Hibata et al. ............... | 297/478 |
| 6,443,382 B1 | * | 9/2002 | Bae ........................ | 297/478 X |

* cited by examiner

*Primary Examiner*—Rodney B. White
(74) *Attorney, Agent, or Firm*—Fitch, Even, Tabin & Flannery

(57) ABSTRACT

An interlock system for stopping seat belt payout from a retractor when a seat is not secured is provided. The interlock system includes a connector between the seat latch and the retractor with the connector operating a retractor locking actuator which utilizes the vehicle inertia sensor to cause retractor locking. In one form, the actuator is shifted into engagement with the inertia member for retractor locking when the seat is released. In another form, the actuator is mounted to a module secured on one side of the one of the retractor frame plates to which the actuating mechanism for the vehicle sensor is secured on the other side thereof. The connector causes shifting of the actuator member from the one side to the other to operate the vehicle sensor actuating mechanism for retractor locking when the seat is released.

20 Claims, 9 Drawing Sheets

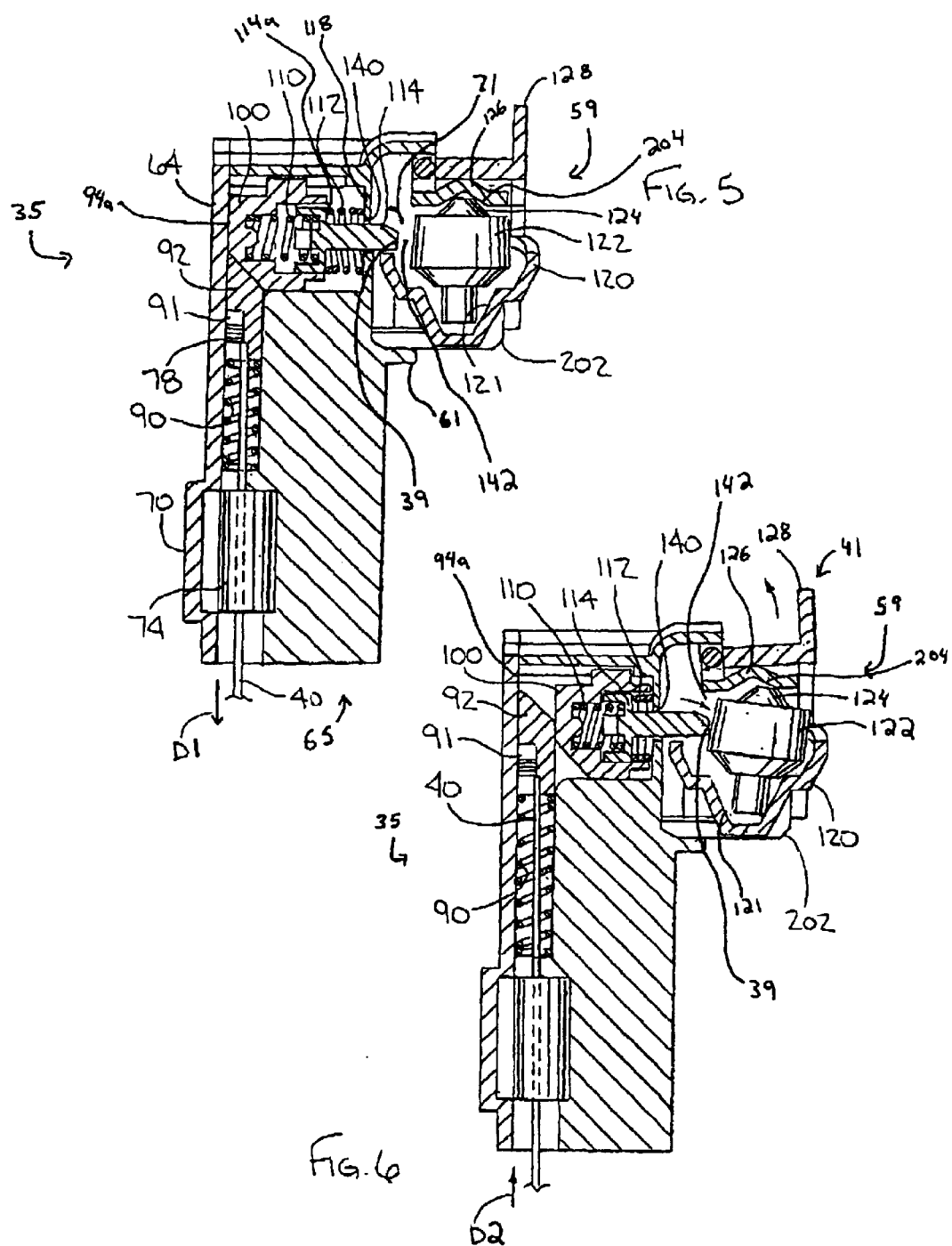

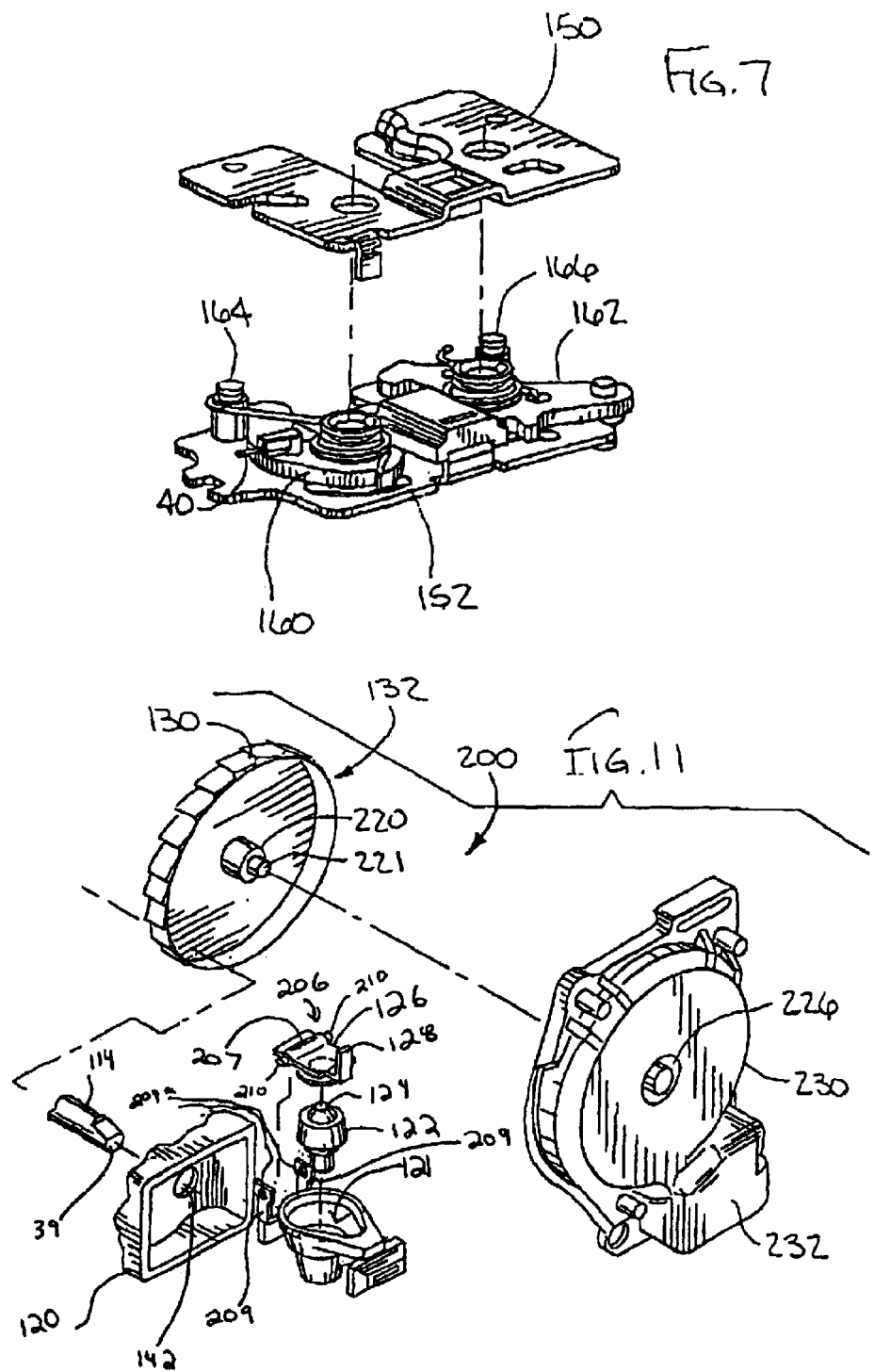

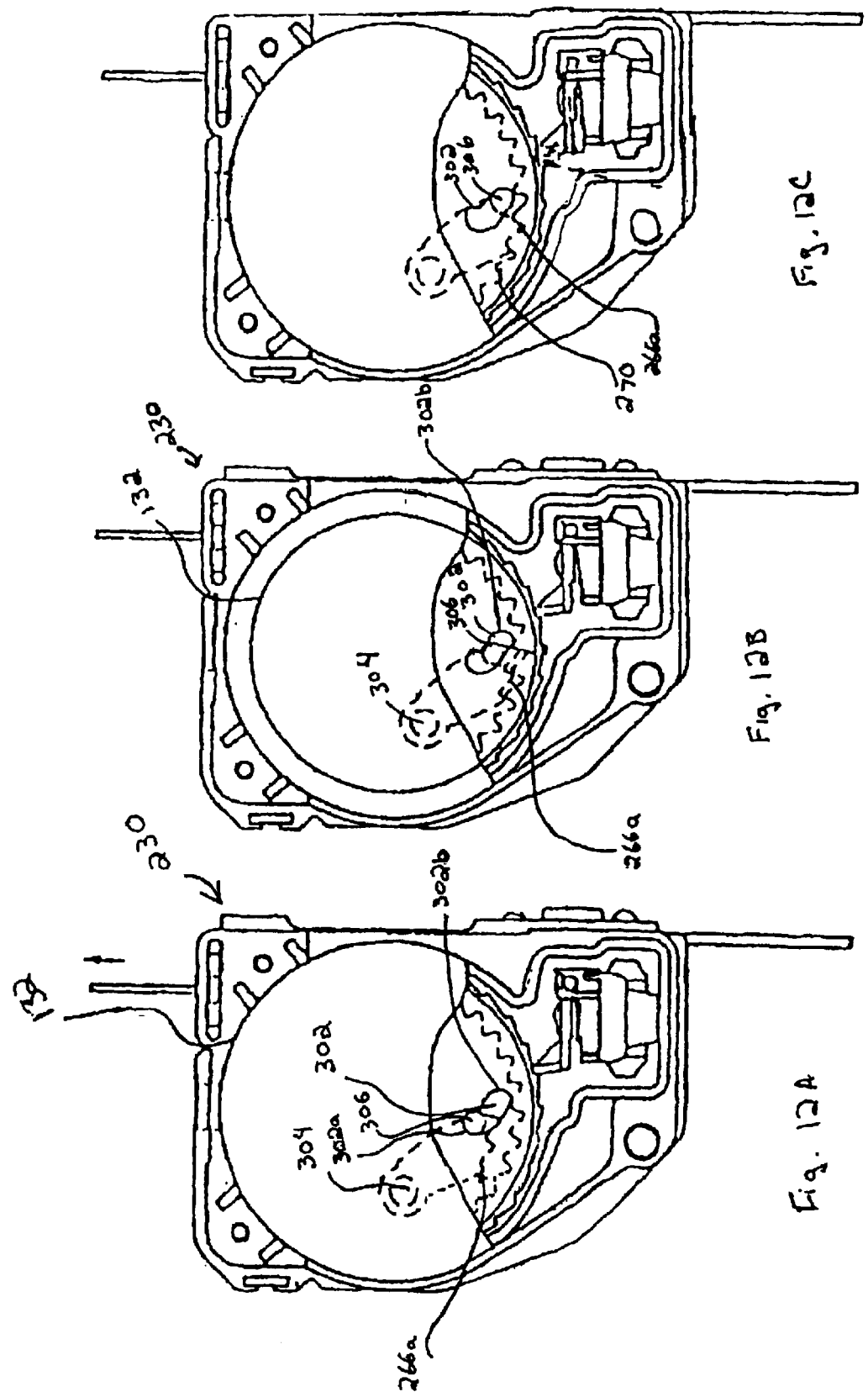

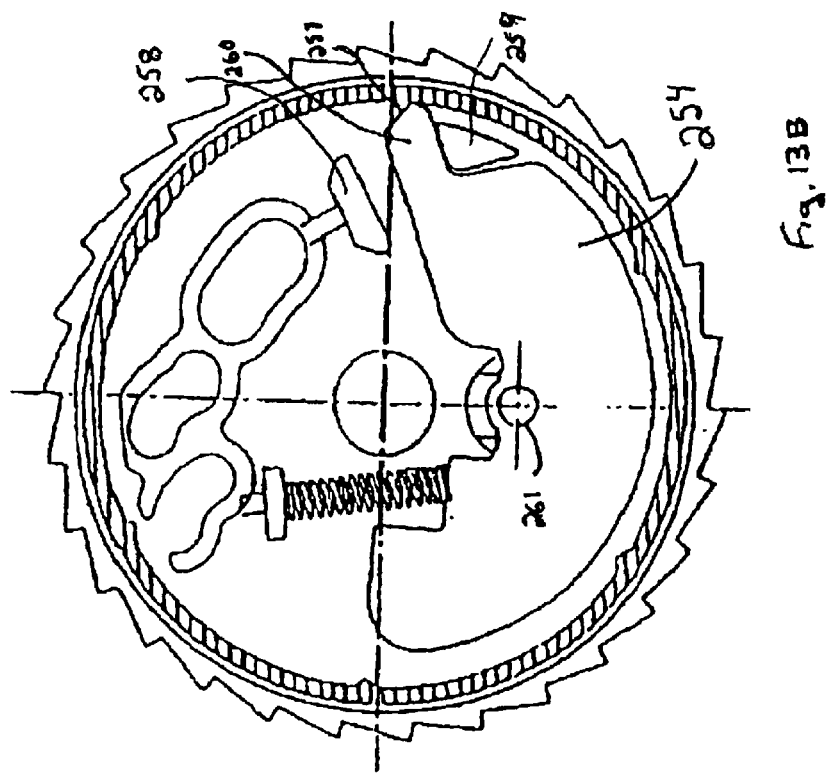
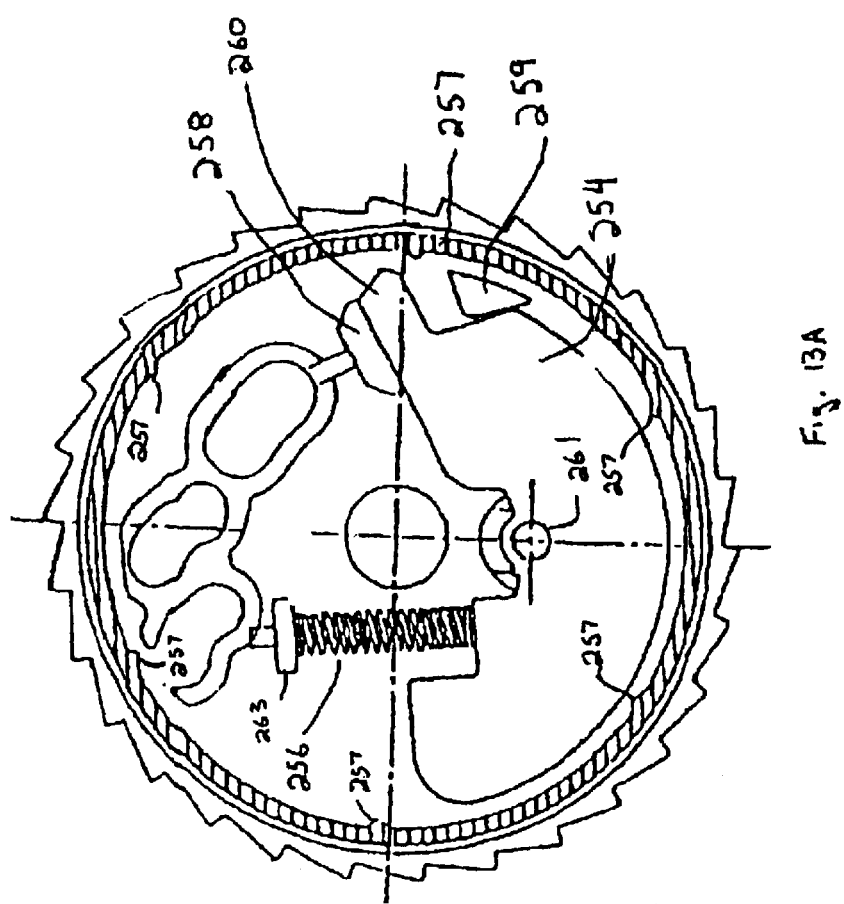

INTERLOCK SYSTEM FOR SEAT BELT RETRACTOR

FIELD OF THE INVENTION

The present invention relates to seat belt retractors and, more particularly, to an interlock mechanism for a seat belt retractor for stopping belt payout when a vehicle seat is not secured.

BACKGROUND OF THE INVENTION

At present, various mechanisms and systems are utilized for locking a seat belt retractor. Specifically, mechanisms are employed with the seat belt retractor so that when a vehicle employing the seat belt retractor undergoes a predetermined acceleration or deceleration, an inertia member senses this vehicular acceleration change and shifts from a rest position, thereby precipitating the locking of the seat belt retractor. As used hereinbelow, acceleration and deceleration are used interchangeably to denote a change in velocity of a vehicle. Often, the inertia member when shifted operates a lock member such as a lever or pawl member which locks into a geared or toothed wheel that can be fixed to a spool around which the seat belt or seat belt webbing is wound. When the inertia member is shifted, the lock member locks into the wheel, and the spool is unable to rotate in at least the belt protraction direction that would be required for seat belt webbing to be protracted or pulled out from the seat belt retractor.

When a vehicle experiences a rapid deceleration, all items within or connected to the vehicle that are not fixed or secured will have an inertial tendency to continue forward. For example, items in an empty seat or in a cargo area of a vehicle will often slide forward from a rest position when the vehicle rapidly slows.

Another example is a seat that is in an unlocked position. Many vehicle seats are designed to be folded down, or manually released, for quickly and easily moving the seat in order to gain access more easily to an area adjacent to the seat. For instance, a two-door vehicle may have a back seat which is substantially accessible for a passenger's body only by releasing a front seat so that the passenger may ingress the vehicle. In some vehicles such as station wagons, a rear row of seats is provided which may fold down or only a single seat in the row such as the middle seat may pivot so the area they or it occupies may be used as cargo area. In other vehicles, a seats or seats are provided which may fold down to provide access from the interior of the vehicle to a trunk or storage compartment. If retractors are located in these pivotal seat backs, then the seat backs need to be in their upright locked position during vehicle operation for proper inertia sensor operation.

When the seat back is not latched and the vehicle is operated, then the inertia sensor will not operate properly to cause retractor locking at excessive decelerations since the seat back is no longer locked against movement due to its own inertia in these conditions. Accordingly, if a pivotal seat is not secured, the inertia sensor will move with the seat back and thus will not operate to cause retractor locking.

Prior retractors that locked when the seat back in which they are mounted is not secured are carefully constructed to avoid shifting the inertia member, and instead focus on shifting the levers or pawls of the locking mechanism that the inertia member operates during excessive vehicle accelerations/decelerations. To this end, prior retractors have required modifications to the inertia member lock mechanism and have also needed precision design of their components to properly activate the locking mechanism, see U.S. Pat. Nos. 6,045,194 and 6,302,489.

Accordingly, there is a need for a retractor interlock system that is better suited for use with known retractors. More specifically, an interlock system that does not require significant alterations to the inertia locking system would be desired.

SUMMARY OF THE INVENTION

In accordance with the invention, an interlock system is provided for locking the seat belt retractor when a seat is not in its releasably locked or secured position. In one form, the interlock system herein is well-adapted to be implemented with existing retractors by employing an actuator that acts on the retractor's inertia member when the seat back is not secured in its upright position. In this instance, a connector in the form of a Bowden cable extending between the retractor and seat back latching mechanism operates the actuator for shifting the inertia member to its active or operative position causing locking of the retractor against seat belt protraction therefrom. This retractor locking accordingly occurs in its normal fashion as if the retractor were sensing excessive vehicular accelerations/decelerations so that the inertia member causing the retractor locking mechanism is operable. In this manner, the interlock system does not require extensive modifications to the retractor's existing locking mechanism and/or adaptations that avoid shifting the inertia member but which function to operate the locking mechanisms as by directly pivoting a lock lever or pawl for engagement in locking teeth of the retractor.

In another aspect, the interlock system is adapted for retrofitting by the provision of an interlock module including a housing in which a retractor locking actuator is mounted for shifting. The retractor has a conventional design with an inertia sensor module mounted to one of the side plates of the retractor frame at the outer side thereof. The other inner side of the retractor side plate is typically free of structure attached thereto. Accordingly, the housing of the interlock module is mounted to the side of the retractor plate opposite the side at which the inertia sensor housing is mounted. In this configuration, the lock actuator is shifted from one side of the frame plate to the other when the seat back is released for causing locking of the retractor. In the preferred form and as already described, the actuator shifts into engagement with the inertia member for shifting it to its operative position although the actuator could also be adapted in a less preferred form to shift between the opposite sides of the plate member into direct engagement with a lock lever or the like for shifting it to cause retractor locking.

Generally, the plate is provided with a window about which the inertia sensor housing is mounted. In a preferred form, the housing of the interlock module has a lateral opening and is attached to the plate member so that its opening is aligned with the window opening and with the opening in the inertia sensor housing for allowing the actuator to shift into engagement with the inertia member supported in the housing therefor.

As mentioned, the vehicle seat or seat back is secured by a latching mechanism. With respect to details of the preferred interlock system, the latching mechanism for the seat back may have a cable assembly secured to a spring-loaded latching plate at one end thereof, and the other end of the cable assembly secured to a slide or cam actuator member of an actuator assembly in the interlock module. The cam actuator member is spring biased for camming engagement with a barrel of the interlock actuator assembly. The other end of the cable assembly is affixed to the latch plate such that when the latching mechanism is in its proper latched condition, the cable assembly pulls the cam slider actuator against its spring bias toward the latching mechanism. In this condition, the barrel is spring-loaded to its inoperative position in which the retractor is fully operational such that belt webbing can be withdrawn from the retractor in the absence of rapid acceleration or deceleration conditions.

The barrel of the interlock mechanism carries a pin that can project through the opening of the interlock module and into engagement with the inertia member in the housing of the retractor's vehicle sensor module. The pin projects through the opening of the interlock module and into engagement with the inertia member when the seat latching mechanism is in its unlatched condition. In this condition, the cable assembly shifts away from the latching mechanism under the influence of the spring bias provided to the cam slider member. The interlock module housing includes two compartments transverse to each other, one for the cam slider and the other for the barrel and pin assembly. Cooperating cam surfaces on the cam slider and barrel member cause the barrel and pin to shift toward the inertia member, such as a standing man, when the slider is spring biased into camming engagement with the barrel.

More specifically, this camming action causes the pin to be advanced through the opening in the module, and through the adjacent window of the retractor frame into engagement with the preferred standing man inertia member so that the standing man topples in the sensor module. Manifestly, other inertia members such as inertia balls or pendulum weights could also be employed. Toppling of the standing man lifts an actuator lever resting thereon into engagement with teeth formed on a rotating lock gear. The lock gear normally rotates with the retractor shaft on which the belt webbing is spooled. A main pawl is pivotally mounted to an adjacent end of the shaft and includes a projection that extends into a cam slot hole formed in the lock gear. With the lock gear stopped by the lifted lever of the vehicle sensor, the projection is cammed in the slot of the stopped lock gear as seat belt webbing continues to be protracted by rotation of the reel shaft. The camming of the pawl projection pivots the main pawl into locking engagement with internal teeth formed about a large circular opening in one of the side plates of the retractor frame. At substantially the same time, a back-up pawl interconnected to the main pawl by an elongate pin member is pivoted so that it locks into engagement with the internal teeth in the large circular opening formed in the other side plate of the retractor frame. This stops the reel shaft from rotating thereby preventing further belt payout.

BRIEF DESCRIPTION OF THE DRAWINGS

FIG. 5 is a cross-sectional view of the assembled interlock system showing a cam surface of the cam slider member, and a cooperating cam surface on the barrel member with the standing man in its rest position;

FIG. 6 is a cross-sectional view similar to FIG. 5 except showing the cam member advanced to drive the barrel member and pin into engagement with the standing man to shift it to its toppled, active position;

FIG. 7 is a partially exploded perspective view of the latching mechanism for the vehicle seat back showing one end of the cable connected to one of the spring loaded latch plates of the latching mechanism;

FIG. 11 is an exploded perspective view of a portion of the locking mechanism for the retractor showing the standing man, the lock lever and the lock gear;

FIGS. 12A–12C are schematic views showing locking of the retractor via the locking mechanism of the retractor vehicle inertia sensor; and FIGS. 13A and 13B are schematic views showing locking of the retractor via the web sensitive sensor including a flywheel of the retractor.

DETAILED DESCRIPTION OF THE PREFERRED EMBODIMENTS

Figure 1:
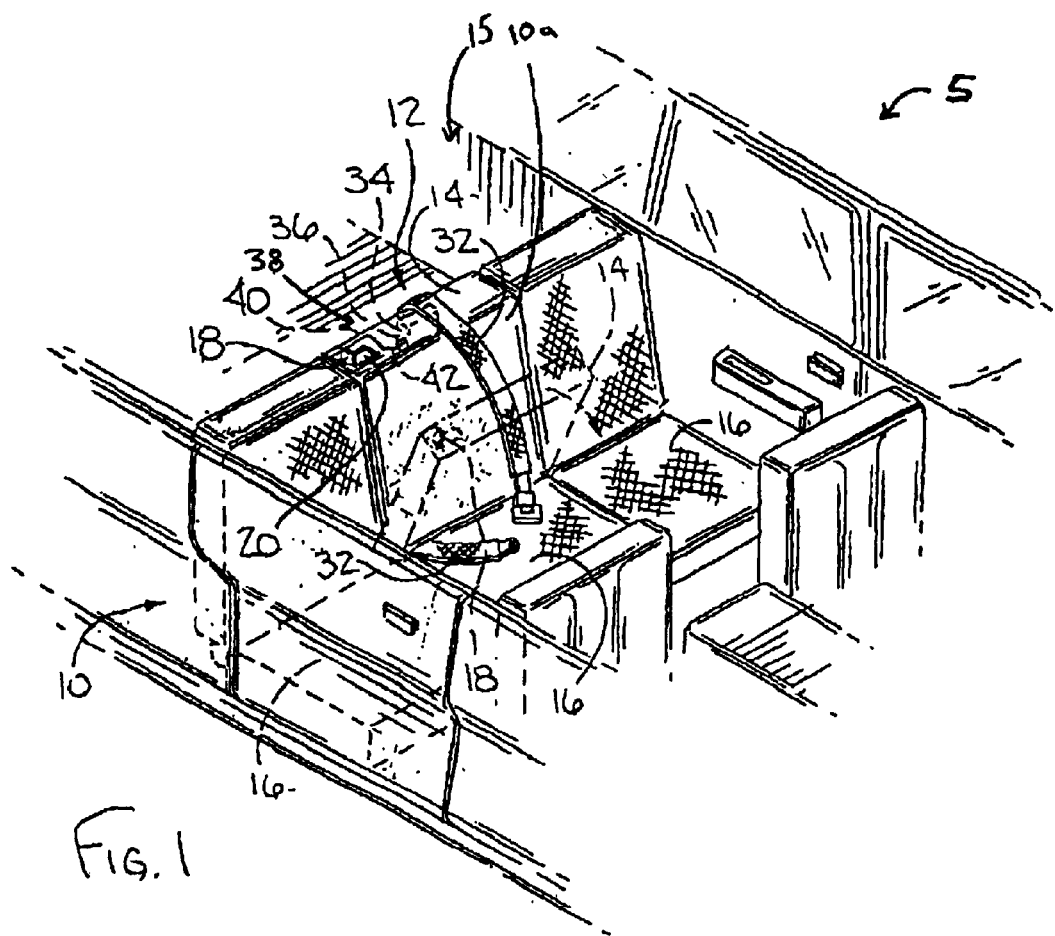
FIG. 1 is a perspective view of a rear row of vehicle seats schematically showing a retractor on a pivotal seat back connected by a cable to a latching mechanism for the seat back.
Figure 2:
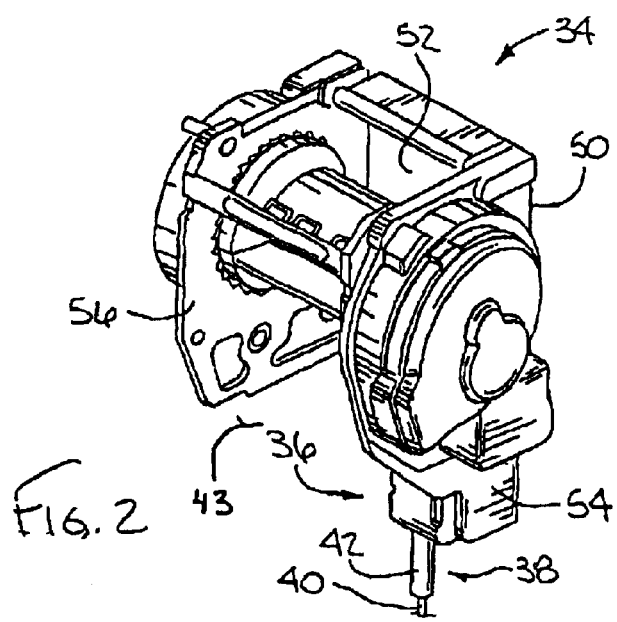
FIG. 2 is a perspective view of the retractor having a frame with side plate members showing an inertia sensor module and an interlock module mounted on opposite sides of one of the plate members.
Figure 3:
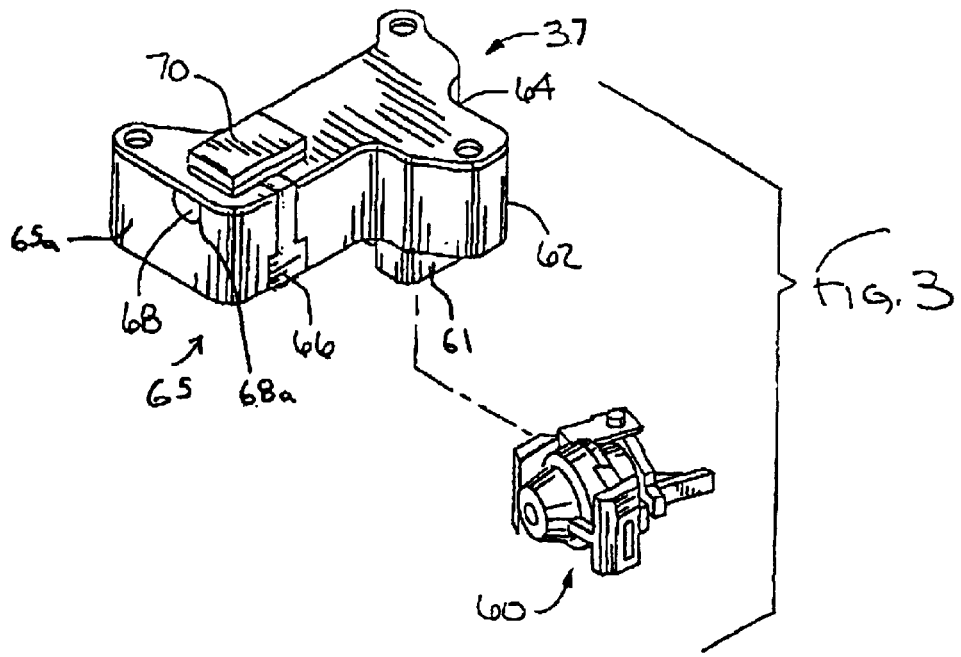
FIG. 3 is a perspective view of the interlock module showing a housing thereof and a case of the inertia sensor module.

In FIG. 1, the passenger compartment of a vehicle 5 is shown including a row of rear seats 10 having at least one of the seats 10 such as the illustrated middle seat 10a provided with pivotal seat back 14 to provide access to the cargo space 15 from the passenger compartment. To release the seat back 14, latching mechanism or seat latch 20 is manually operated via an actuator 18 thereof such as in the form of a projection or tab. The latching mechanism 20 can be provided along the side of the seat back 14 with which it is operable to releasably secure it in a predetermined upright position. Normally, the seat latch 20 includes a spring loaded locking mechanism so that when a passenger pivots the seat back 14 to its upright position, it locks in place without need for manual operation of the latch actuator 18. The interlock system 36 described herein is not limited to any one specific type of seat latch 20 as long as it allows the seat back 14 to be releasably held or secured in its upright position via a detent mechanism thereof.

Figure 8:
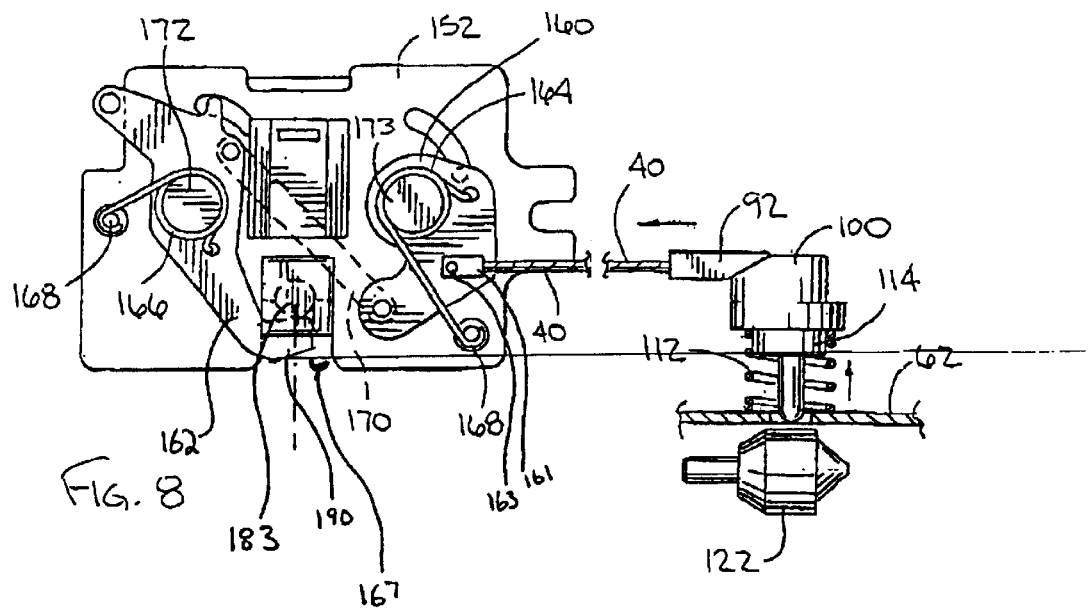
FIG. 8 is a plan view of the interlock system showing the latching mechanism in the latched position with the pin of the interlock module disengaged from the standing man.

Retractors 34 for seat belt webbing 32 can be placed in the seat backs 14 for space conservation purposes in the passenger compartment. The present invention is directed to an interlock system 36 that connects the retractor 34 in a seat back 14 to the seat latch 20 therefor so that belting can not be paid out or protracted from the retractor 34 unless the seat latch 20 is in its latched position or condition (FIG. 8). When the latch 20 is in its release position (FIG. 9), the retractor 34 is locked against belt protraction.

Referring to FIGS. 5 and 6, the interlock system 36 preferably includes an actuator assembly 35 that generally includes retractor locking actuator or, in the preferred and illustrated form, an inertia member actuator 39. In this manner, the interlock system 36 utilizes the locking mechanism of a vehicle inertia sensor 59 such as are typically found in retractors to cause retractor locking. Operation of the actuator assembly 35 and the retractor locking actuator 39 thereof is controlled by a connector 38 that interconnects the seat latch 20 to the retractor 34 and specifically the actuator assembly 35 at the retractor 34.

As shown in FIG. 6, the locking mechanism 41 of the vehicle inertia sensor 59 includes an inertia member in the form of a standing man 122 that is shifted to its active or toppled position by the inertia member actuator 39 when the seat latch 20 is in its release condition. Accordingly, an unlatched seat back 14 causes the retractor locking mechanism to be actuated in its normal manner whether or not the vehicle is undergoing the excessive vehicle accelerations that would cause toppling of the standing man 122 and consequent retractor locking. Since the interlock system 36 actuates the inertia member, it is well-suited for being incorporated into current retractors employing vehicle inertia sensors without requiring significant modifications to the locking mechanisms thereof.

Figure 12:
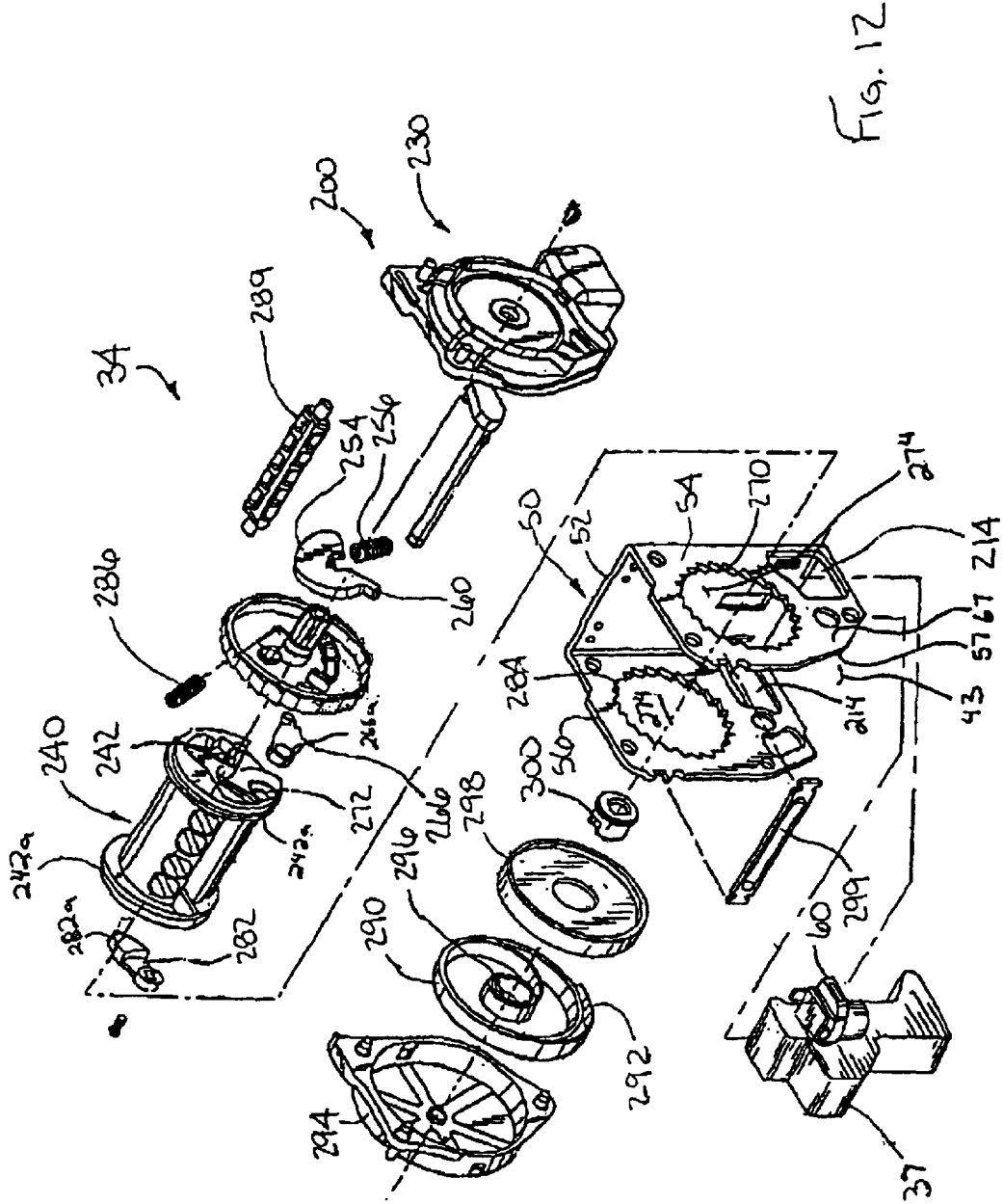
FIG. 12 is an exploded perspective view of the retractor incorporating the interlock module showing the retractor locking mechanism including the pawls and tie bar associated with the retractor reel.

The actuator assembly 35 is preferably incorporated in a module 37 including a housing portion 62 in which the components of the actuator assembly 35 are shifted. In known retractors, the vehicle inertia sensor is likewise typically incorporated in a module 60 including a housing 202. Such retractors normally include a frame 50 having a transverse plate 52 and opposite side members such as plates 54 and 56. The plates 54 and 56 each have a large circular opening 274 with internal teeth 270, 284 extending thereabout as shown in FIG. 12. At least one lock gear 132 having external teeth 130 formed about its periphery is mounted for rotation with the reel shaft 242 adjacent the large opening of one of the plate members. The plates 54 and 56 can each include respective lower window openings 214 to allow the sensor module 60 to be mounted at either of window openings 214 in the side plates 54, 56 so as to be adjacent to and below the lock gear 132 depending on which side of the reel 240 it is disposed. This allows the sensor module 37 and specifically the standing man 122 therein to shift a lock member 128 in the form of a lever or finger member into the teeth of the lock gear 132 when the threshold acceleration/deceleration level is exceeded. Manifestly, those skilled in the art will recognize other retractor configurations could be employed.

In the above-described known retractor configuration, the interior area 43 between the side plates 54, 56 and below the reel 240 is generally free of structure or other encumbrances. Accordingly, the housing 65 of the interlock module 37 is preferably mounted to the inner side 57 of the side plate member 54, and the actuator assembly 35, and specifically the actuator member 39 thereof is adapted to shift from the inner side 57 of the plate 54 to the outer side 67 of the plate 54 at which the vehicle inertia sensor housing 202 is mounted when the seat latch 20 is in the release position thereof. The transverse shifting of the actuator member 39 as operated by the cable assembly 38 thus allows the form factor of the retractor 34 to stay substantially the same despite incorporation of the interlock module 37. In this aspect, while it is preferred for the actuator member 39 to engage and shift the inertia member 122 as previously-described, it is also possible for it to act on other components of the locking mechanism of the retractor vehicle sensor to effect a locking action for the retractor, such as the lock member 128. Accordingly, in the preferred and illustrated form, the interlock system 36 is well-suited for retrofitting to current retractors 34 such as those employing a vehicle sensor 59 as described herein. In this manner, significant structural modification to the retractor and the vehicle sensor thereof are not required, and the vehicle seat for the retractor 34 need not be significantly altered or expanded but for the need to route the cable assembly 38 to the seat latch 20.

More specifically, the connector preferably is in the form of a cable assembly 38 that interconnects the seat latch 20 to the retractor 34. The cable assembly 38 can include a Bowden cable 40 and a tabular casing 42 such that ends of the casing 42 are generally fixed at the retractor and the seat latch, respectively, the cable 40 is located within the casing 42, and the cable 40 may provide a force in both push (compression) and pull (tension) directions.

As the latching mechanism 20 is released, and the seat arrangement 10 is in a released position, the latching mechanism 20 pushes the cable 40 in a direction towards the interlock mechanism 36. The pushing of the cable 40 towards the interlock mechanism 36 causes the seat belt retractor system 34 to lock the seat belt 32 and to prevent protraction or pulling-out of seat belt 32 from the seat belt retractor system 34. When the latching mechanism 20 and seat arrangement 10 are returned to a secured position, the latching mechanism 20 pulls the cable 40 in a direction away from the interlock mechanism 36. The pulling of the cable 40 away from the interlock mechanism 36 causes the seat belt retractor system 34 to operate as under normal conditions.

The interlock mechanism 36 is shown in greater detail in FIGS. 3–6, as well as the relationship between the interlock mechanism 36 and the inertia member sensor module 60. The module 37 of the interlock mechanism 36 includes a main housing portion 62 and a cover 64 which secures to the housing portion 62 with a spring tongue 66 received by a similarly shaped cavity 63 (FIG. 4) to form an interlock housing 65. When the cover 64 is secured to the housing portions 62, a longitudinally extending passageway 68 is provided in the housing 65 through which the cable 40 passes. The housing portion 62 includes a flange 61 for being inserted in the plate lower window 214 and which provides a cavity 71 into which the inertia member module 60 is seated for mounting to the retractor. The flange 61 secures to the periphery of the module 60. As discussed herein, the preferred standing man inertia member 122 is inoperative when in a vertical position. The retractor and the module 60 are mounted so that, in the absence of rapid velocity change, the inertia member 122 is generally vertical. Accordingly, the flange 61 provides proper alignment for the sensor module 60 and the interlock module 37 relative to each other with the inertia member 122 in its vertical rest position.

Figure 4:
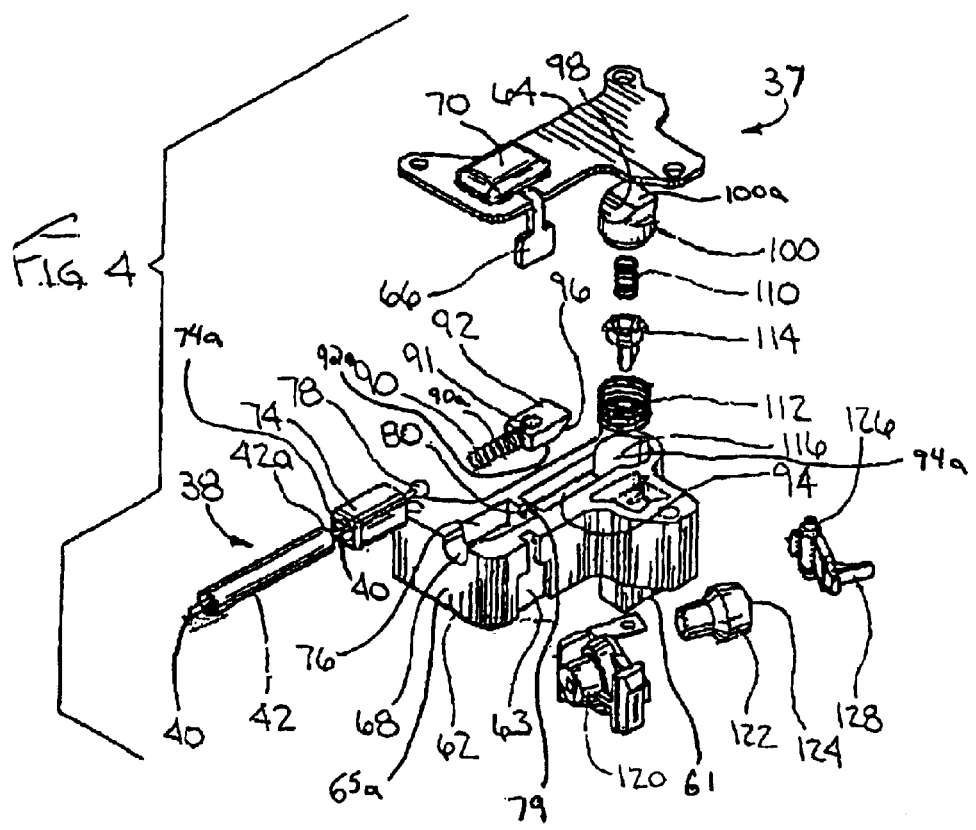
FIG. 4 is an exploded perspective view of the interlock housing and inertia sensor module showing the components of the interlock actuator assembly including the cam slider member, the barrel carrying member, and the pin, and the case, standing man and actuating lock lever of the inertia sensor module.

As can be seen in FIG. 4, the cable assembly 38 includes the cable 40 generally surrounded by the casing 42 and includes a rectangular cable collar 74 for locating the cable 40 in the passageway 68. One end 42a of the casing 42 abuts against the lower end 65a of the housing 65 about the lower opening 68a to the passageway 68 in order to fix the casing 42 and prevent movement of the casing end 42a. The housing 62 includes a rectangular recess 76 for receiving the collar 74, and the cover 64 has an integrally formed hold cap 70 aligned with the rectangular recess 76 and also receives a portion of the collar 74. The collar 74 includes a through opening 74a sized as to allow the cable 40 to extend through and reciprocate within the collar 74.

As discussed above, the cable 40 is moved in a direction towards the interlock mechanism 36 to operate an inertia member actuator in order to place the seat belt retractor system 34 in a locked position and is moved in a direction away from the interlock mechanism 36 in order to place the seat belt retractor system 34 in an un-locked position.

As illustrated in FIG. 4, the end of the cable 40 includes a head 78 that passes through the coils 90a of a spring 90 and is secured in an aperture 91 formed in a cam slider member 92. The housing 62 includes a transverse wall 79 in which a cable recess 80 is formed for receiving and guiding reciprocation of the cable 40 in the passageway 68. The wall 79 divides the passageway 68 to form an upper chamber or channel 94 thereof in which the cam slider 92 resides and within which the cam slider 92 is guided for reciprocation in a linear fashion between the retractor locked (FIG. 6) and unlocked (FIG. 5) positions.

The cam slider 92 has a camming surface 96 which cooperates with a camming surface 98 of a carrying member of the actuator assembly 35, as shown in the form of a barrel 100. The cam slider 92 is spring-biased by the spring 90 such that it urges the cable 40 to move in a direction towards the interlock mechanism 36 when the seat back 14 is un-secured or released. The cam slider 92 moves in a longitudinal direction so that it cams against the barrel 100 and causes the barrel 100 to be shifted transversely to the direction in which the cam slider 92 is being advanced. Conversely, when the seat back 14 is secured in the upright position by the seat latch 20, the cable assembly 38 pulls the cam slider 92 against the spring bias of spring 90 to remove the driving force applied to the barrel 100.

The interlock housing 65 has a transverse passage or bore 116 which opens at its rear end to the upper end 94a of the channel 94 and at its forward end to the lateral window 140 formed in an upper wall portion 118 of the housing 65. In addition to the can slider 92 and barrel 100, the actuator assembly 35 includes a pin plunger member 114 carried by the barrel 100 with the barrel 100 and pin 114 guided for reciprocation in the upper bore 116 of the interlock housing 65. The barrel 100 and pin 114 assembly are spring biased rearwardly by a spring 112. The spring 112 is engaged between the front end 114a of the barrel 100 and pin 114 assembly and the wall portion 118 of the interlock housing 65. Thus, spring 112 and a spring 110 urge the cam slider 92 and barrel 100 into engagement with each other. On the other hand, spring 110 is provided between the barrel 100 and pin member 114 to urge the plunger pin 114 forwardly so that, with the barrel 100 fixed in its advanced position with the seat back released as shown in FIG. 6, the plunger pin 114 can retract against its spring bias to allow for the seat belt 32 to be retracted onto the reel 240, as will be described more fully hereinafter.

When the cable 40 is advanced with the seat latch 20 in its release position, the cable 40 is spring-biased by spring 90 to advance the cam slider 92. The advancing cam slider 92 shifts longitudinally in the channel 94, and the surface 96 of the cam slider 92 cams against the camming surface 98 to drive the barrel 100 laterally or in a transverse direction to the longitudinal direction in the passageway 116. The lateral displacement compresses the coil spring 112 which normally urges the barrel 100 away from the standing man 122 toward engagement with the cam member 92. With the barrel 100 driven to its advanced position, any retraction of the barrel 100 is prevented by confronting front and rear surfaces 92a and 100a of the cam slider 92 and barrel 100, respectively, that extend parallel to each other and are slidingly engaged as shown in FIG. 6. As mentioned, the barrel 100 carries a pin member 114 which is spring-biased by spring 110 toward the standing man 122 to allow the pin member 114 to reciprocate when the barrel 100 is fixed in its advanced position with the seat latch 20 released so that seat belt retraction is permitted while seat belt protraction is still blocked, as discussed more fully hereinafter.

With latching of the seat latch 20, the cable 40 is retracted, pulling the cam slider 92 down in the channel 94 so that the confronting surfaces 92a and 100a are shifted past each other. At the end of the pull stroke, the cam surfaces 96 and 116 are fully mated, or they can be spaced from each other, so that they are no longer in driving engagement with each other, to allow the spring biased barrel 100 and pin 114 assembly to return to their retracted position spaced from the standing man 122 under the influence of the bias force provided by spring 112.

The inertia member module 60 includes a sensor case 120 having a cup 121 configured to support the standing inertia member 122 in its vertical rest position in the sensor case 120 and for tipping movement at a predetermined vehicle acceleration which pivots an upper nose 124 on the inertia member 122. A lock actuator member 126 rests on the upper nose 124 of the standing man 122 and is lifted so that the upturned finger 128 thereof engages in outer peripheral teeth 130 of the rotating lock gear 132 to arrest turning of the lock gear 132 (FIG. 10) when the standing man 122 is shifted to its active or operative position as by toppling thereof.

In FIGS. 5 and 6, the un-locked position and locked positions, respectively, of the interlock mechanism 36 are depicted. The arrow D1 indicates the direction of cable movement in when the cable 40 is undertaking its pull stroke, as described above, and arrow D2 indicates the direction of cable 40 movement when the cable 40 is undertaking its push stroke. FIG. 5 shows the cable 40 at the end of its pull stroke with the cam surfaces 96 and 98 fully engaged. In the un-locked position where the interlock mechanism 36 does not operate the inertia member 122, the pin 114 is retracted so as to be disengaged from the standing man 122, although a portion of the pin 114 can still be extending beyond the interlocking housing upper wall portion 118 and into the window opening 140 formed therein, as shown in FIG. 5. The cam slider 92 is attached to the cable 40. For this purpose, the slider 92 can include an aperture 91 into which the head 78 of the cable 40 is tightly fit, thereby connecting the cam slider 92 and the cable 40. Accordingly, as the interlock mechanism 36 shifts between an un-locked position and a locked position, the cam slider 92 moves in the same direction as the cable 40 to which it is connected.

As the cable 40 moves in its push stroke, the camming surface 96 of the cam slider 92 cams against and past the camming surface 98 of the barrel 100 with the barrel 100 being driven forwardly in the transverse bore 116 to allow the surfaces 92a and 100a to shift into confronting relation and slide against each other. Driving the barrel 100 carrying the pin 114 therewith forwardly causes the pin 114 to be advanced through the window 140 and into a window 142 formed in the housing 202 of the inertia member module 60. The shifting of the pin 114 brings it into engagement with the inertia member 122 for toppling thereof to effect the locking of the seat belt retractor system.

Figure 9:
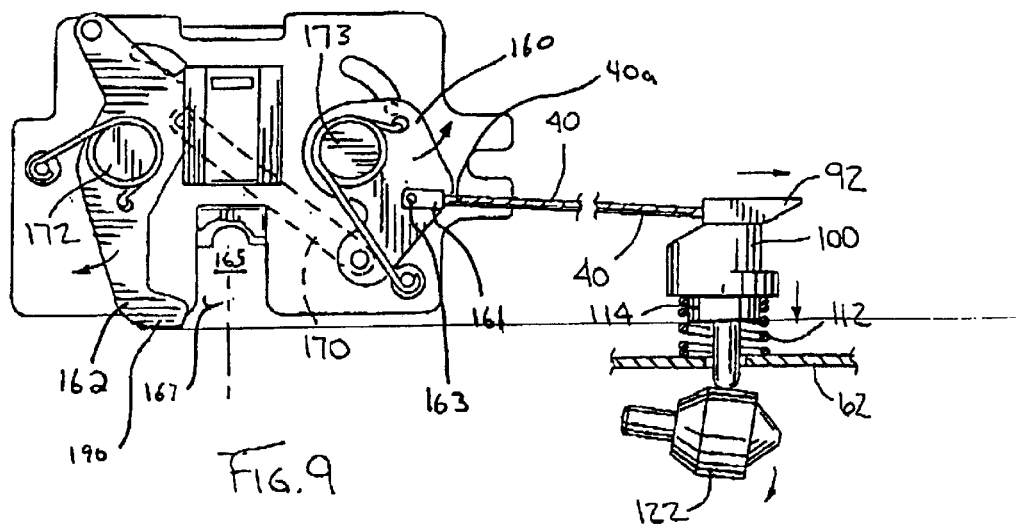
FIG. 9 is a plan view similar to FIG. 8 showing the latching mechanism in the release position with the pin engaged with the standing man.

Details of the illustrated latching mechanism 20 will next be described with particular reference to FIG. 7. As shown, the latching mechanism 20 includes a cover 150 and a base 152 to which the internal components of the latching mechanism 20 are secured. As can be seen in FIGS. 7–9, the latching mechanism 20 includes a pair of pivotal latch plates 160 and 162 with latch plate 160 being a follower so that pivoting thereof is controlled by the pivoted position of the latch plate 162. The latch plate 162 acts as a detent to releasably secure a seat bolt 183 associated with the seat back 14 to the seat latch 20. The follower plate 160 has the seat latch end 40a of the cable 40 secured thereto. Respective torsion springs 164 and 166 are mounted about pivots 172 and 173 about which the latching plates 160 and 162 are pivoted. The springs each have one end connected to a post 168 and the other to the plate 160, 162 for urging the plates 160, 162 in a predetermined pivotal direction about their respective pivots 172, 173. The follower plate 160 is attached to the latch plate 162 such as by connector 170 so that pivoting of the plate 162 causes pivoting of the plate 160. Generally, the plate 162 will have two operative positions, one in which hook portion 190 thereof captures the seat bolt 183 in a slot 165 of the seat latch (FIG. 8.), and the other, after manual operation of the latch actuator 18 for releasing the seat bolt 183 from the slot 165, where the hook portion 190 pivots back to an interference position relative to the slot 165. In this position, the plate 162 is not pivoted as far back as in the lock position thereof such that the follower plate 160 also has two different positions for pushing and pulling on the cable 40.

Figure 10:
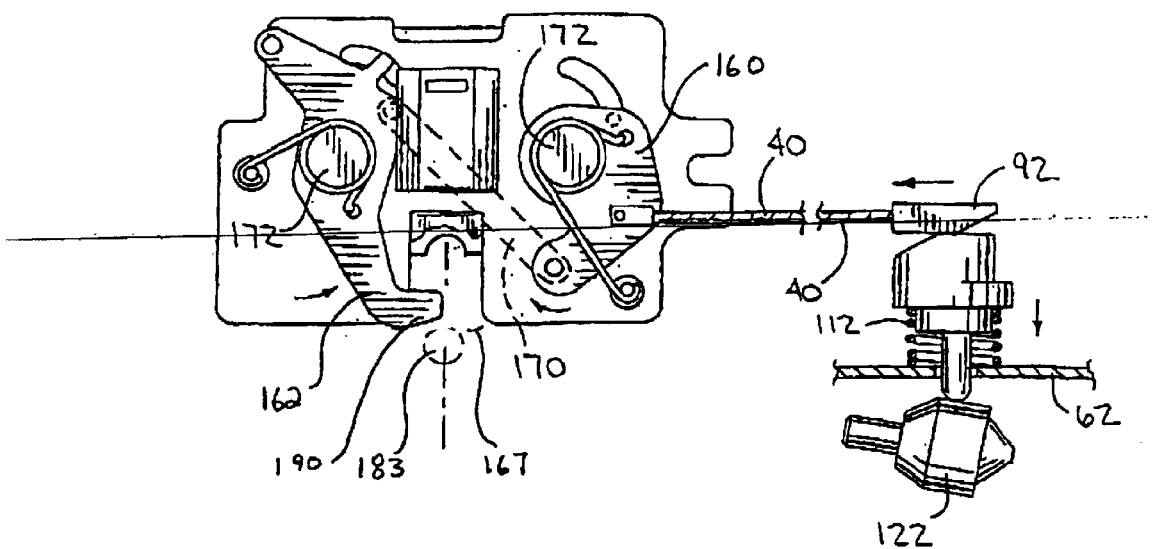
FIG. 10 is a plan view similar to FIGS. 8 and 9 showing the latching mechanism in the release position with a latch plate pivoted to an interference position and the pin engaged with the standing man.

When the seat bolt 183 is released by the seat latch 20, the plate 162 is pivoted from its full open position as shown in FIG. 9 back into the interference position with respect to the slot 165 of the seat latch 20 shown in FIG. 10. In use, the latching mechanism 20 is released by shifting of the latch actuator 18 which rotates the latch plate 162 around its pivot 172 allowing the seat bolt 183 to be removed from the slot 165 through access opening 167 thereto. This causes pushing on the cable 40 so that the cam slider 92 advances under the influence of its spring bias and drivingly engages the fully retracted barrel 100. When the actuator 18 is released and the plate 162 pivots back to its interference position with the seat back released, the cam slider 92 is pulled so as to be retracted slightly from its fully advanced position. However, the surfaces 92a and 100a are sized for engagement relative to each other so that upper portion and lower portion, respectively, thereof remain in confronting relation to keep the barrel 199 fixed in its advanced position, as shown in FIG. 6.

The cable 40 is connected to the latch plate 160 by a lead 161 which rotates around a lead post 163. The latch plate 160 may rotate around its pivot 172 when the latching mechanism 20 moves between a position where the seats 10 are in a latched position (FIG. 8) and a position where the seats 10 are in an unlatched position (FIG. 9). The casing 42 of the cable assembly 38 is secured to the latching mechanism so that, as the latch plate 160 rotates, the cable 40 reciprocates within the casing 42. As the latch plate 160 moves from a latched position to an unlatched position, the cable 40 is pushed towards the interlock module 37, and when the latch plate 160 moves from an unlatched position to a latched position the cable 40 is pulled away from the interlock module 37. As the latch plate 160 rotates around its pivot 172, the lead 161 and the end of the cable 40 attached to the lead 161 rotate around the lead post 163 to maintain a generally linear reciprocation of the cable 40. As the seat back 14 is secured in the upright position by the seat latch 20, the cable assembly 38 pulls the cam slider 92 against the spring bias of spring 90 which biases the cam slider 92 toward the actuator assembly 35.

In FIG. 11, a vehicle sensor 200 is depicted including the inertia sensor module 60 with a retractor side cover 230 including an inertia module cover portion 232 in which the sensor case 120 is received and which cooperates to form a portion of the housing 202 for the inertia sensor module 60. The sensor case 120 is held in place by the inertia member module housing 202 which includes the window 142 (see FIGS. 5, 6 and accompanying discussion) through which the pin 114 is advanced when the interlock mechanism 36 is in a locked position. The upper, rounded end or nose 124 of the inertia member 122 is positioned within a concave seat 204 (FIGS. 5–6) on the underside of the pick or lock actuator member 126 which can be in the form of the illustrated lever member 206 that is pivotally mounted to upwardly extending and laterally spaced arms 209 of the case 120. The lever member 206 includes integral pivot shaft 207 having reduced diameter bearing portions 210 at either end thereof for pivotally fitting in openings 209a formed at the upper ends of the arms 209. The vehicle sensor housing 202 and particularly the casing thereof is supported by the flange 61 of the interlock housing 65 with the housing portion 232 secured to the side plate 54 so that the flange 61 projects through the lower window 214 thereof.

In the preferred and illustrated form, the locking mechanism of the vehicle sensor includes a lock gear 132 that is mounted to be rotatable with reel 240 at the one of the pair of enlarged flanged ends 240a and 240b thereof that is adjacent the side plate 54. In this manner, the lock gear 132 is situated adjacent to and above the lock lever 206 that rests on the standing man 122 so that lifting of the lever 206 causes it to engage in the peripheral teeth 130 of the gear 132 to stop rotation thereof.

The lock gear 132 includes a cam slot 302 formed therein. A pawl assembly is pivotally mounted to the reel shaft 242 and includes a pair of pawl members 266, 282 interconnected by an elongate pivot bar 304 extending through an axial bore 272 formed in the reel 240 so as to position the pawls 266, 282 at either reel flange end 240a, 240b. The main pawl 266 at flanged end 240a includes a projection 306 thereon which fits into the cam slot 302. With the standing man 122 at the inactive or rest position thereof, the projection 306 is at end 302a of the slot 302 and the reel 240 and the lock gear 132 rotate together, as shown in FIG. 12A. In this position, distal engagement ends 266a, 282a of the main pawl 266 and back-up pawl 282 are pivoted so that they are spaced from the teeth 270, 284 of the respective retractor frame side plates 54, 56 to allow for substantially free belt protraction from the retractor absent excessive belt webbing accelerations. The pawl assembly can be spring biased toward this unlocked position by spring 286. When the standing man 122 is shifted to its operative, toppled position either by excessive vehicular acceleration or because the seat back is released, the lever finger 128 is lifted into engagement with the lock gear 132 to arrest continued rotation thereof. As the lock gear 132 is journaled for rotation with the reel shaft 242, the shaft keeps turning with continued belt payout so that the pawl projection 306 is cammed in the now fixed slot 302, as shown in FIG. 12B.

The camming action of the pawl projection 306 causes the projection 306 to move toward the other end 302b of the slot 302. The cam slot 302 has an arcuate shape that is configured to cause the main pawl 266 to pivot as the projection 306 shifts therein. When the projection 306 reaches the other end 302b of the slot 302, the pawl engagement end 266a is pivoted into engagement with the teeth 270 of the frame plate 54, as shown in FIG. 12C. Simultaneously, at the other side of the reel shaft 242, the back-up pawl 282 is also pivoted into engagement with the teeth 284 of the other side plate 56 as it is attached to the pivotal main pawl 266 by the pivot bar 304 that rotates about its axis in the bore 272 with camming of the main pawl projection 306.

A return spring 290 is mounted in cover 294 for biasing the reel shaft 242 to turn in the rewind or belt retraction direction. Inner end 296 of the spring 290 is fixed to bushing 300 that is fixedly mounted to reel shaft 242, and outer end 292 of the spring 290 is fastened to the spring case 298 secured to the frame plate 56 so that the spring 290 rotates the reel shaft 242 in the rewind direction.

To allow rotation of the reel 240 in the rearwind direction when the seat back is released, the plunger pin 114 is spring biased toward the standing man 122 by the spring 110, as previously described. Accordingly, while the barrel carrying member 100 is fixed in its forward, advanced position when the seat latch 20 is in the release position, the plunger pin 114 can shift rearwardly against its spring bias to allow the standing man 122 to shift back to its vertical position with the lock member 126 lowered and shifted out of engagement with the lock gear teeth 130 as seat belt webbing is retracted onto the reel 240. The pawls 266, 282 and retractor frame teeth 270, 284 are configured to allow ratcheting of the pawl ends 266a, 282a over the teeth 270, 284 as the reel 240 rotates in the rewind direction. Once belt retraction reaches its limit, the pin 114 acts to again cause toppling of the standing man 122 as the retraction force against the forward bias force on the pin spring 110 is removed.

Turning to more of the details of the illustrated retractor, a web sensor in the form of a flywheel 254 is mounted to a rotating member such as lock gear 132 that rotates with a retractor wheel or reel 240, as shown in FIGS. 13A and 13B. A pivot pin 261 pivotally mounts the flywheel 254 to the rotating member 132. The flywheel 254 is spring biased to it inoperative position by spring 256 extending between the flywheel 254 and an integral tab 263 on the member 132. A stop 258 is formed on the member 132 against which nose end 260 of the flywheel 254 abuts when it is biased to its inoperative position. The pivot pin 261 is eccentric to the turning axis of the rotating member 132. Accordingly, when rotation of the reel shaft 242 exceeds a predetermined extraction acceleration threshold, the flywheel 254 shifts against its spring bias with nose end 260 engaged against another stop 259 on the member 132 and swung radially outwardly and into engagement with one of a plurality of fixed internal projections 257 such as formed on retractor retainer cover 200 to stop rotation of the lock gear 132. Thereafter, continued rotation of the reel 240 in the belt protraction direction is arrested in the same manner as previously described with respect to the vehicle inertia sensor. A webbing guide 289 and tie bar 299 are also mounted to the retractor frame 50 extending between the side plates 54, 56 thereof.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An interlock system that prevents seat belt withdrawal when a vehicle seat is not secured, the interlock system comprising:
   a retractor mounted to the seat from which a seat belt is protracted;
   an inertia member that shifts from an inoperative position to an operative position in response to a predetermined vehicle acceleration;
   at least one lock member operable by the inertia member shifted to its operative position for locking the retractor against belt protraction;
   a seat latching mechanism for locking and releasing the seat;
   an inertia member actuator that shifts the inertia member to the operative position with the seat released by the latching mechanism; and
   a connector extending between the latching mechanism and the inertia member actuator for operating the inertia member actuator with the latching mechanism.

2. The interlock system of claim 1 wherein the inertia member actuator includes a biasing mechanism for biasing the inertia member actuator in a direction away from the inertia member, and the latching mechanism has a secured position in which the seat is secured with the connector pulled to allow the actuator to shift under the influence of the biasing mechanism so that the inertia member actuator does not shift the inertia member to the operative position thereof.

3. The interlock system of claim 1 wherein the connector includes opposite ends with one end attached to the latching mechanism, and
   cam surfaces between the other end of the connector and the inertia member actuator that are configured to drive the inertia member actuator into engagement with the inertia member with the seat released by the latching mechanism.

4. The interlock system of claim 3 wherein the cam surfaces are urged by predetermined bias forces toward engagement with each other and the connector pulls the cam surface associated therewith against its bias force with the seat locked by the latching mechanism, and with the seat released the connector cam surface cammingly drives the inertia member actuator against its bias force by camming engagement with the actuator cam surface.

5. The interlock system of claim 1 wherein the retractor includes a frame having opposite side plate portions including an opening in one of the plate portions, and an inertia member module including the inertia member and having an opening for being aligned with the plate portion opening, and
   an interlock module including the inertia member actuator and a portion of the connector and having an opening for being aligned with the plate portion opening with the interlock module and inertia member module mounted on opposite sides of the side plate portion so that the actuator is advanced through the aligned openings into engagement with the inertia member in the inertia member module.

6. The interlock system of claim 1 wherein the inertia member actuator includes an inertia member engaging member and a carrying member which is fixed in an advanced position with the seat released by the latching mechanism, and
   a biasing member between the engaging member and carrying member for urging the engaging member into engagement with the inertia member with the carrying member at the advanced position thereof and allowing the lock member to ratchet over teeth of the retractor in which the lock member is engaged for belt retraction when the seat is released.

7. The interlock system of claim 1 wherein the inertia member comprises a standing man, and the actuator topples the standing man to the operative position thereof for lifting the lock member to lock the retractor against belt protraction with the seat released.

8. The interlock system of claim 1 wherein the retractor includes a rotatable reel, a frame including opposite plate portions having openings and teeth formed thereabout, and a lock gear having peripheral teeth and being mounted for rotation with the reel, and the at least one lock member comprises a lock lever associated with the inertia member and at least one pawl associated with the reel such that shifting of the inertia member to the operative position causes the lock lever to engage in the lock gear teeth and stop its rotation which causes the reel pawl to engage in the teeth of one of the frame plate portions to stop rotation of the reel and belt protraction therefrom.

9. An interlock system for being mounted to conventional retractors having an inertia sensor for stopping seat belt protraction therefrom with occurrence of predetermined vehicle accelerations, the interlock system comprising:

a reel from which seat belting is protracted;

a retractor frame including side members with the reel extending between the side members;

lock teeth disposed peripherally about the reel;

an inertia sensor housing mounted on one side of one of the frame side members;

an inertia member in the housing that is shifted to an operative position at the predetermined vehicle accelerations;

a lock member that is shifted into the lock teeth with the inertia member in the operative portion to stop seat belt protraction from the reel;

an interlock module including a housing mounted to the other opposite side of the one frame side member;

an actuator member mounted in the interlock module housing; and a connecter extending between the interlock module and a latch for a vehicle seat and being operated by the seat latch so that with the seat unlatched the actuator member shifts in a transverse direction relative to the one frame side member between either side of the one side frame member from the side at which the interlock module is mounted to the side at which the inertia sensor housing is mounted for stopping belt protraction from the retractor.

10. The interlock system of claim 9 wherein the actuator member is aligned with the inertia member for shifting the inertia member to the operative position when the actuator member shifts between the opposite sides of the side frame member.

11. The interlock system of claim 9 wherein the connector comprises a cable that is operably connected to the actuator member when the seat is unlatched for pushing the member to shift between the opposite sides of the side frame member.

12. The interlock system of claim 11 wherein the interlock module includes an actuator assembly therein with the actuator assembly including the actuator member and a portion of the connector attached to the actuator assembly, and cam surfaces of the actuator assembly configured such that with the cable advanced in a first direction along the side frame member the actuator member is cammingly driven in the transverse direction to the first direction.

13. The interlock system of claim 12 wherein the interlock module has transverse passages in which portions of the actuator assembly are guided for shifting.

14. The interlock system of claim 9 wherein the one side frame member and the housings for the inertia member and the interlock module each include an opening with the housings mounted to the side frame member so that the respective openings thereof are aligned with each other to permit the actuator member to shift therethrough.

15. The interlock system of claim 14 wherein the opening in the interlock module housing is aligned with the inertia member so that the actuator member shifts the inertia member to the operative position when the seat is unlatched.

16. The interlock system of claim 9 wherein the reel has a lock gear including the lock teeth with the lock member being pivoted by the inertia member when shifted to the operative position thereof for engaging in the lock gear teeth and stopping rotation thereof.

17. The interlock system of claim 9 wherein the side frame members include openings having the lock teeth disposed thereabout with the lock member comprising a pair of pawls that are indirectly shifted into engagement with the frame lock teeth by the inertia member shifted to the operative position thereof.

18. A seat belt retractor and vehicle seat latching assembly comprising:

a rotatable reel from which seat belting is protracted;

an inertia sensor including an inertia member that shifts to an operative position for causing the reel to be blocked against rotation in the belt protraction direction;

a seat latch for releasably securing a seat back in an upright position;

a cable assembly extending between the retractor and the seat latch;

a cam slider member attached to the cable assembly at the retractor; and an inertia member actuator having a cam surface that cooperates with the cam slider member so that the actuator is cam driven into engagement with the inertia sensor for shifting the inertia member to the operative position thereof with the seat back released by the seat latch.

19. The assembly of claim 18 wherein the cam slider member and actuator include associated spring members that bias the cam slider member and actuator into engagement with each other with the cam driving of the actuator shifting the actuator against the spring bias thereof, and the cable assembly pulling the cam slider member against the spring bias thereof with the seat back secured in the upright position by the seat latch.

20. The assembly of claim 18 wherein the actuator comprises a carrying member having the cam surface thereon, and a pin member projecting from the carrying member for being driven into engagement with the inertia member.

* * * * *

UNITED STATES PATENT AND TRADEMARK OFFICE
CERTIFICATE OF CORRECTION

PATENT NO. : 6,923,506 B2
DATED : August 2, 2005
INVENTOR(S) : Tanabe et al.

It is certified that error appears in the above-identified patent and that said Letters Patent is hereby corrected as shown below:

Column 13,
Line 5, after "reel, and" begin a new paragraph.
Line 28, change "portion" to -- position --.

Signed and Sealed this

Twenty-second Day of November, 2005

JON W. DUDAS
*Director of the United States Patent and Trademark Office*